Figure 1:
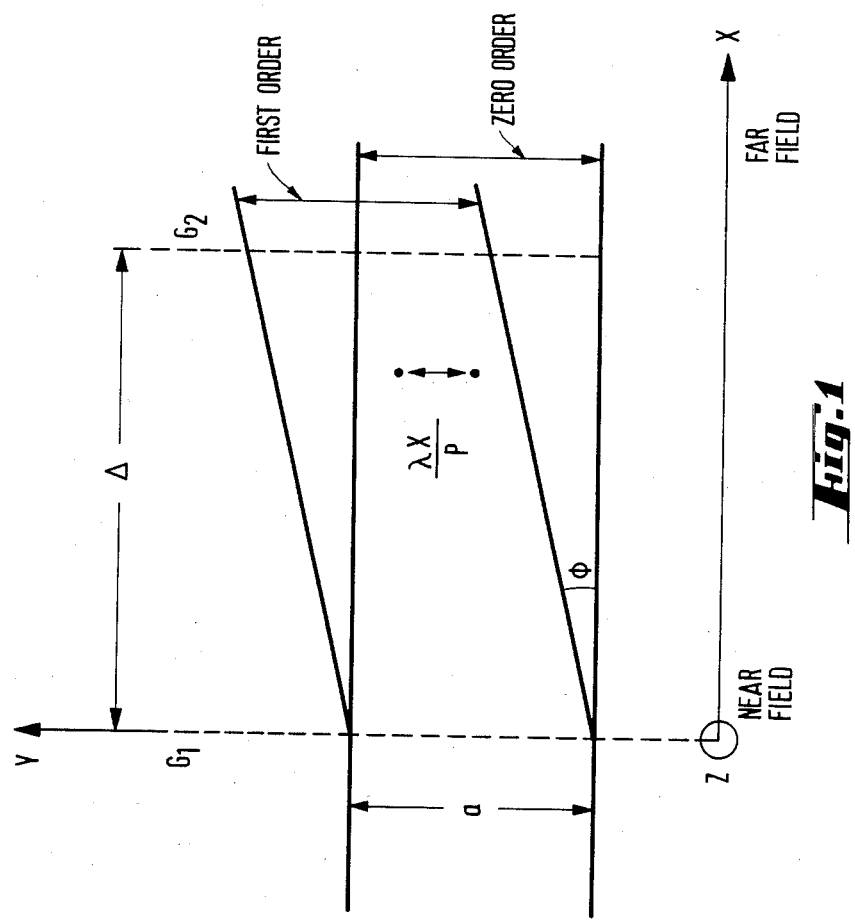

United States Patent [19]

Kafri et al.

[11] Patent Number: 4,553,839
[45] Date of Patent: Nov. 19, 1985

[54] FREQUENCY MARKING SYSTEMS

[76] Inventors: Oded Kafri, 3 Ehud St., Beer-Sheva 84 234; Ziv Karny, 20 Zeelah St.; Dan Meyerstein, 12 Arava St., both of Omer, all of Israel

[21] Appl. No.: 463,615

[22] Filed: Feb. 3, 1983

[30] Foreign Application Priority Data

Jun. 24, 1982 [IL] Israel .................................. 66126

[51] Int. Cl.$^4$ ............................................. G01J 3/00
[52] U.S. Cl. ..................................... 356/300; 356/328
[58] Field of Search ............... 356/300, 328, 334, 354; 350/162.11, 162.17

[56] References Cited

PUBLICATIONS

Rassudova, *Optics & Spectroscopy*, vol. 22, No. 3, Mar. 1967, pp. 255–258.

*Primary Examiner*—F. L. Evans

[57] ABSTRACT

A frequency marker system for indicating the wavelength of light rays, said system comprising: means for collimating said light rays, first and second grating means aligned with at least a portion of said collimated light waves and separated by a distance Δ for providing Moire patterns, means for determining the changes in wavelengths responsive to changes in frequency by determining deflections of the Moire patterns.

6 Claims, 4 Drawing Figures

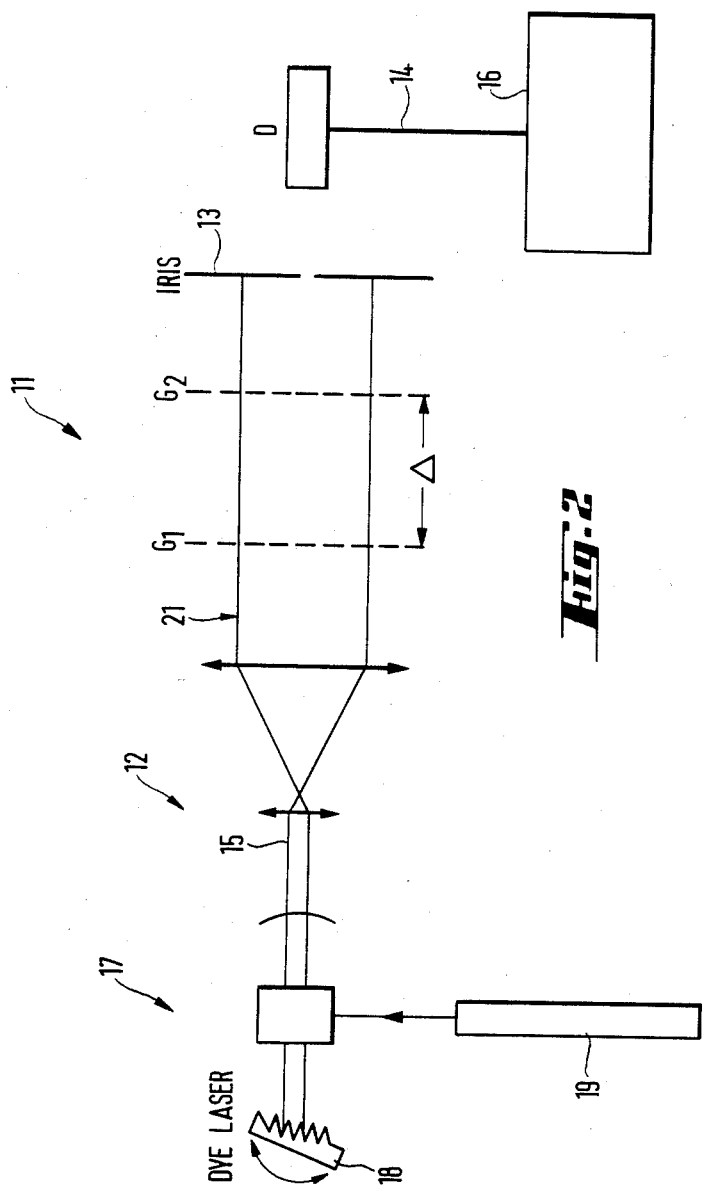

FREQUENCY MARKING SYSTEMS

This invention is concerned with methods and systems for frequency marking and more particularly with frequency markers such as are used in conjunction with optical experiments, testing and processes.

Frequency markers are essential to many optical processes such as spectroscopical experiments and tests. The frequency marker serves to produce a signal at certain frequencies so that the wavelength at which a particular portion of a test or process is being run can be ascertained. The methods presently available for marking wavelengths in such spectroscopical tests, for example, are mechanical methods and optical methods. The mechanical methods are sensitive to mechanical faults and therefore are used only for rough indications. The optical methods are based on interferometry. The markings using interferometry requires highly sensitive and relatively expensive equipment. In addition highly skilled technicians are required when using interferometry. Thus, there is no presently available method for obtaining frequency markings with reliability and repeatability using relatively inexpensive equipment and relatively unskilled personnel.

Accordingly it is an object of the present invention to provide new and improved frequency marker equipment and methods in which the above referred to disadvantages are substantially reduced or overcome. According to the present invention a frequency marker system for indicating the wavelength of light rays, comprises:

means for collimating said light rays, first and second grating means aligned with at least a portion of said collimated light waves for providing Moire patterns, means for determining the changes in wavelength responsive to changes in frequencies by determining the Moire patterns.

Also according to the present invention a new method of determining the wavelength of light rays is provided for frequency modulated light rays, said method comprising the steps of:

measuring changes in the diffraction angle of the light rays as a function of varying frequencies by Moire deflectometry.

A feature of the inventive system provides for projecting a Moire fringe grating through iris means, light detecting means aligned with said iris for detecting deflection of said pattern means, means operated responsive to the output of said light detection means for recording said output amplitude as a function of wavelength whereby said output indicates the amount the pattern is shifted by the varying wavelengths caused by the modulating frequency.

The method further features determining each shift of a period in said Moire grating and indicating said shift to thereby indicate the change in wavelength of said frequency modulated light source.

A further feature of the invention comprises simultaneously recording the changes in wavelengths and the results of the tests whereby the results of the tests are automatically frequency marked.

Figure 3A:
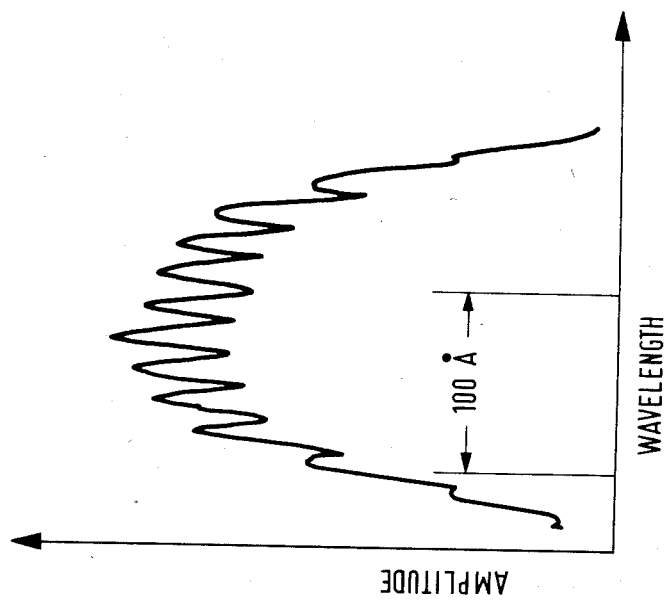
Figure 3B:
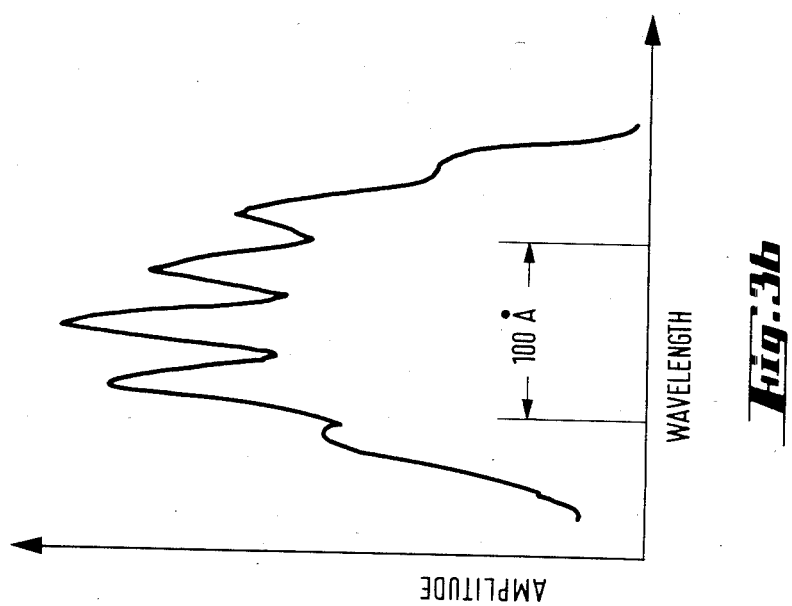

The operation and utilization of the present invention will be more fully apparent from the description of a preferred embodiment taken in conjunction with the following drawings, in which:

FIG. 1 diagrammatically shows a Moire deflectometer for purposes of explaining the invention, FIG. 2 schematically shows the inventive system for using the Moire deflectometer for frequency marking, and FIGS. 3a and 3b show the signals obtained by the frequency marker of FIG. 2 for grating separators of 40 cms and 80 cms, respectively.

Moire deflectometry has been disclosed for many users by the owner of this application in the past. Examples of such disclosures are in phase object analysis, topographical mapping of reflecting objects, see for example Israeli Patent Application Ser. No. 61405 filed on 4.11.80 (see U.S. Pat. No. 4,459,027) and Ser. No. 62742 filed on 28.4.81. In addition the use of Moire deflectometry for determining the index of refraction of fluids is disclosed in an Israeli patent application filed contemporaneously with this application.

Moire deflectometer techniques used for determining wavelengths or frequencies provide results equivalent to those obtained by interferometry. Instead of measuring differences in optical lengths (which are proportional to refractive indices) it measures ray deflections of collimated beams (which are proportional refractive index gradients). That same technique is used herein for measuring the diffraction angle of the light which is proportional to the light wavelength.

The Moire deflectometer system 11 comprises a collimated light source, shown generally at 12, and a pair of gratings G1 and G2 spaced apart by a distance Δ. Iris means 13 are used for obtaining a selected portion of a Moire pattern on a detector D. The detector can be a photomultiplier tube or one of many types of devices that react to light. The output of the detector D is coupled to a recording device 16 through conductor 14.

A light source 17 shown as a dye laser 18 and an $N_2$ laser 19 operating together to provide a light input to a telescope 15 provides the collimated light beams 21. G1 is the defracting grating and G2 is the analysing grating. The two gratings are separated by a distance Δ and mutually rotated so that the grating lines are at an angle $\theta$ to each other.

FIG. 1 shows that when a collimated light beam passes through a transmission grating G1 it is split into several beams. A zero order beam is propagated in the original direction of the collimated light. The other beams are at angles of $\pm n\phi$ where n is the order of the beam and $\phi$ is given by:

$$\phi = \arctan \delta^\lambda/_p)$$

when p is equal to the grating pitch (one period). When the Moire grating is sinusoidal only the zero and the plus and minus first order beams are obtained.

For frequency marking the analysing grating G2 can be a distance shown a Δ in FIG. 2 and FIG. 1. The distance Δ is a distance where the first order beam only partially overlaps the zero order beam. This regime provides the sinosoidal Moire fringe pattern desired. The sinosoidal pattern has the same period as the grating G1. As the wavelength is varied, the interference pattern moves a greater distance in the Y direction when the wavelength λ is increased and a smaller distance when the wavelength λ is decreased. Consequently the Moire fringes formed on the analysing grating G2 will move positively or negatively in the Z direction. Moving the interference pattern one period in the Y direction results in a shift of one period of the Moire fringe in the Z direction (small angle approximation). Since the Moire fringes are magnified by a factor $1/\theta$ which may exceed 10 it is possible to follow small changes in wavelength by this technique.

It can be shown that a $\lambda_o - \lambda = 2p^2/\Delta$ where $\lambda_o - \lambda$ causes the Moire pattern to move a full period.

Thus if the Moire pattern is adjusted to an iris so that there is maximum light passing through the iris then the detector will provide a maximum output on the recorder for every shift in wavelength of $\lambda_o - \lambda$.

In use of FIG. 2 a collimated light source is provided. The collimated light is split up. Part of the collimated light is used in spectrometry and the other part is sent through or transmitted through a pair of gratings G1 and G2 separated by a distance $\Delta$. The Moire deflectometry pattern is adjusted to an iris that enables a light detector to determine when the Moire pattern has shifted one period. The output of the detector is recorded simultaneously with the recording of test results of the spectrometer thereby automatically providing frequency marking.

FIGS. 3a and 3b show typical recording from the recorder of FIG. 2 when $\Delta = 40$ cm and 80 cm respectively. Note that at 40 cm the measured $\lambda_o - \lambda$ is twice the wavelength of $\lambda_o - \lambda$ at 80 cm, i.e. 28 Å to 14 Å.

Therefore the sensitivity and resolution of the system is a function of the distance $\Delta$ between the gratings. The distance $\Delta$ can readily be changed because, among other things, the requirement of parallelism between the two gratings is not rigid, therefore good resolution can be obtained. The advantage of this system over prior art systems such as Fabri Perot interferometry is this system's simplicity which is especially useful for low resolution measurements. Only two gratings and a collimated light source are required. For relatively low resolutions, that is of a wavelength difference in the order of a greater than 1 Angstrom, low cost optics can be used.

While the principles of the invention have been described above in connection with specific apparatus and applications it is to be understood that this description is made by way of example only and not as a limitation on the scope of the invention.

We claim:

1. A frequency marker system for indicating the wavelength of light rays, said system comprising:
    means for collimating said light rays,
    first and second light transmitting grating means aligned with at least a portion of said collimated light rays and separated by a distance $\Delta$ for providing Moire patterns, and
    means for determining the changes in wavelengths of the collimated light rays by determining shifts of the Moire patterns including light detecting means for determining changes in light amplitude downstream of said second light transmitting grating means.

2. The frequency marker system of claim 1 further comprising iris means aligned with the shadow of a Moire fringe between said second light transmitting grating means and said light detecting means.

3. The frequency marker system of claim 2 wherein recorder means are attached to said light detector means for recording variations in the amplitude of said detected light as a function of wavelengths.

4. The frequency marker system of claim 3 wherein said recorder means simultaneously records the changes in wavelength and the results of tests whereby the results of the tests are automatically frequency marked.

5. A method of determining changes of the wavelength of light rays the steps comprising:
    collimating the light rays into a collimated light beam;
    passing the collimated light beam through a pair of light transmitting gratings separated by a distance $\Delta$ to produce a Moire pattern; and
    determining changes in the wavelength of the light rays as a function of the shifts of the Moire pattern.

6. Apparatus for determining changes in the wavelength of light rays, comprising
    means for collimating said light rays,
    a first light transmitting grating for producing a sinosoidal Moire pattern, said first grating being aligned with at least a portion of said collimated light rays,
    a second light transmitting grating for producing a sinosoidal Moire fringe pattern, said second light transmitting grating being downstream from said first light transmitting grating and being spaced a distance therefrom such that a first order beam only partially overlaps a zero order beam, and
    light detecting means for determining changes in light amplitude downstream of said second light transmitting grating, whereby changes in wavelengths of the collimated light rays are determined by shifts of the Moire pattern.

* * * * *

UNITED STATES PATENT AND TRADEMARK OFFICE
CERTIFICATE OF CORRECTION

PATENT NO. : 4,553,839

DATED : November 19, 1985

INVENTOR(S) : KAFRI et al.

It is certified that error appears in the above-identified patent and that said Letters Patent is hereby corrected as shown below:

On the front of the patent add the following:

[73] Assignee: The State of Israel, Atomic Energy Commission Beer-Sheva 84 190, Israel Signed and Sealed this Nineteenth Day of August 1986

[SEAL]

Attest:

DONALD J. QUIGG

Attesting Officer

Commissioner of Patents and Trademarks